(12) United States Patent
McGrade

(10) Patent No.: US 7,303,608 B2
(45) Date of Patent: Dec. 4, 2007

(54) GROUNDWATER REACTIVE GAS INJECTION AND VENTING SYSTEM FOR A GROUNDWATER REMEDIATION SYSTEM

(75) Inventor: Daniel McGrade, Lake Wylie, SC (US)

(73) Assignee: SPX Corporation, Charlotte, NC (US)

( * ) Notice: Subject to any disclaimer, the term of this patent is extended or adjusted under 35 U.S.C. 154(b) by 440 days.

(21) Appl. No.: 11/016,820

(22) Filed: Dec. 21, 2004

(65) Prior Publication Data

US 2006/0130655 A1 Jun. 22, 2006

(51) Int. Cl.
*B01D 19/00* (2006.01)

(52) U.S. Cl. .................. 95/254; 210/747; 210/758

(58) Field of Classification Search .............. 210/620, 210/747, 758; 405/128.5; 95/254
See application file for complete search history.

(56) References Cited

U.S. PATENT DOCUMENTS

| | | | |
|---|---|---|---|
| 4,118,447 A | 10/1978 | Richter | 261/122.1 |
| 5,216,821 A | 6/1993 | McCabe et al. | 34/17 |
| 5,261,791 A | 11/1993 | Goguen | 417/2 |
| 5,263,795 A | 11/1993 | Corey et al. | 405/128 |
| 5,279,740 A | 1/1994 | Basile et al. | 210/610 |
| 5,384,048 A | 1/1995 | Hazen et al. | 210/605 |
| 5,738,789 A | 4/1998 | Shugina | 210/610 |
| 5,753,494 A * | 5/1998 | Hater et al. | 435/262.5 |
| 5,967,230 A * | 10/1999 | Cooper et al. | 166/245 |
| 6,517,288 B2 | 2/2003 | Schindler | 405/128.5 |
| 6,719,904 B2 | 4/2004 | Schindler | 210/620 |
| 6,805,798 B2 * | 10/2004 | Kerfoot | 210/620 |
| 2002/0185451 A1 | 12/2002 | Schindler | 210/747 |
| 2003/0165358 A1 | 9/2003 | Brown et al. | 405/128.5 |
| 2005/0274670 A1 | 12/2005 | Perriello | 210/610 |
| 2006/0131244 A1 | 6/2006 | McGrade | 210/739 |

OTHER PUBLICATIONS

Joseph Devary—New Technologies Attack Soil, Groundwater Contamination; Mar. 17, 2003.

* cited by examiner

*Primary Examiner*—Robert A. Hawkins
(74) *Attorney, Agent, or Firm*—Baker & Hostetler LLP

(57) ABSTRACT

In a system for collecting gas from a subsurface body of contaminated water, a site collects unabsorbed reactive gas from the subsurface body of contaminated water. In addition, a vacuum source is connected to the site. Furthermore, a controller regulates a flow of the reactive gas from the site to the vacuum source.

19 Claims, 4 Drawing Sheets

GROUNDWATER REACTIVE GAS INJECTION AND VENTING SYSTEM FOR A GROUNDWATER REMEDIATION SYSTEM

FIELD OF THE INVENTION

The present invention generally relates to a system and method for injecting and venting gasses during remediation of groundwater. More particularly, the present invention pertains to a system for venting gasses during remediation of contaminants in groundwater and its method of use.

BACKGROUND OF THE INVENTION

Soil and groundwater contamination is a time consuming and costly environmental remediation challenge. Contaminants include a wide variety of substances such as naturally occurring and synthetically derived chemicals. Typically, contaminated materials are removed from the site, at great cost, for decontamination elsewhere.

In addition to the cost, disadvantages associated with conventional remediation methods include the duration of the procedure and the disruption of structures located above the groundwater.

Accordingly, it is desirable to provide a system for remediating groundwater that is capable of overcoming the disadvantages described herein at least to some extent.

SUMMARY OF THE INVENTION

The foregoing needs are met, to a great extent, by the present invention, wherein in some embodiments a system for remediating contaminated groundwater and a method of using such a system is provided.

An embodiment of the present invention relates to a system for injecting and collecting gas from a subsurface body of contaminated water. The system includes a site, pressurized source for injecting the reactive gas into the groundwater, vacuum source, and a controller. The system injects the reactive gas into the groundwater using a pump and/or compressor and collects unabsorbed reactive gas from the subsurface body of contaminated water. The vacuum source is connected to the site. The controller regulates a flow of the reactive gas from the site to the vacuum source.

Another embodiment of the present invention pertains to an apparatus for removing excess reactive gas from a subsurface body of contaminated water. The apparatus includes a means for providing a vacuum source and a means for determining a collection site. The collection site is configured to facilitate removal of excess chemically reactive gas from the subsurface body of contaminated water. The apparatus further includes a means for generating a path in fluid communication from the collection site to the vacuum source and a means for removing the excess chemically reactive gas from the collection site.

Yet another embodiment of the present invention relates to an apparatus for removing excess reactive gas from a subsurface body of contaminated water. The apparatus includes a vacuum pump, a reaction vessel connected to the vacuum pump, and a valve connected to the reaction vessel. In addition, the apparatus includes a pipe having a first end and a second end. The first end is connected to the valve and a screen is connected to the second end.

Yet another embodiment of the present invention pertains to a method of removing excess gas from a subsurface body of contaminated water. In this method, a vacuum source is provided and a collection site is determined. The collection site is configured to facilitate removal of excess chemically reactive gas from the subsurface body of contaminated water. In addition, a path in fluid communication from the collection site to the vacuum source is generated and the excess chemically reactive gas is removed from the collection site.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
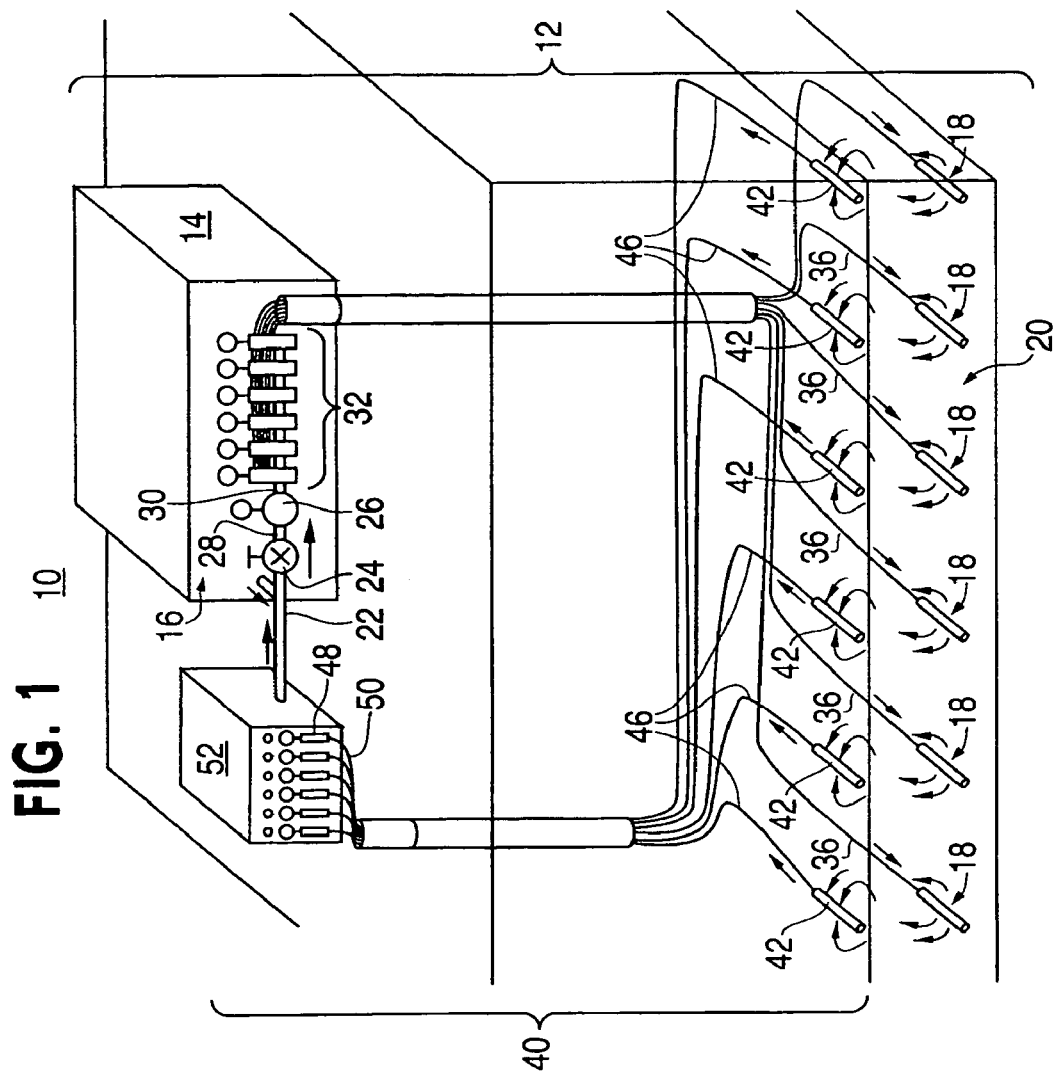
FIG. 1 is a schematic view of a remediation system according to an embodiment of the invention.

The invention will now be described with reference to the drawing figures, in which like reference numerals refer to like parts throughout. Referring now to FIG. 1 a remediation system 10 in accordance with an embodiment of the invention is illustrated. The remediation system 10 is suitable to remediate contaminants that are present in a subsurface body of water via the addition of a chemically active gas to the subsurface body of water. For the purpose of this disclosure, the term, "remediate" and its derivations is defined as being associated with detoxifying, reducing, oxidizing, and/or otherwise cleaning up of contaminants. Specific examples of contaminants that the system 10 is suitable to remediate include at least one of the following: heavy metals; chlorinated solvents; dense, non-aqueous phase liquids (DNAPLs); explosive agents; and the like. Particular examples of heavy metals include: hexavalent chromium; cadmium; mercury; lead; radionuclides such as uranium and technetium; and the like. The specific mode of remediation varies in accord with the particular contaminant. However, in general, hydrogen sulfide reacts with the contaminant to reduce the contaminant to a non-toxic form, as in the case of hexavalent chromium being reduced to trivalent chromium. In another example, an oxidizing agent such as ozone reacts with various contaminants to precipitate the contaminant out of the water and immobilize the precipitate within the soil, as in the case of mercury and lead. In addition, it should be understood that the system 10 is suitable for use to remediate other contaminates or constituents in groundwater or other such subsurface bodies of water and that the system may be used for a variety of other purposes. For example, the system 10 may also be used to assist in remediating contaminants that may be present in or below the soil.

The remediation system 10 preferably includes a source of chemically reactive gas (gas source) 12. The chemically reactive gas utilized in the remediation system 10 may include any suitable gas or mixture of gases. Examples of suitable gases include one or more of hydrogen sulfide, ozone, and the like. In this regard, the gas source 14 includes any suitable storage and/or generating device, such as, for example, a liquid hydrogen sulfide tank, pressurized hydrogen sulfide tank, hydrogen sulfide generator, liquid ozone tank, ozone generator, and/or the like. Examples of hydrogen sulfide generators include a reaction vessel for the chemical synthesis of hydrogen sulfide via at least the following chemical reaction:

$$ZnS + 2HCl \rightarrow H_2S + ZnCl_2 \quad \text{rxn. 1}$$

However, the hydrogen sulfide can be provided in a variety of other forms. Examples of ozone generators include corona discharge-based ozone generators. While the source of chemically reactive gas is preferably pure, it need only be of sufficient purity to remediate the desired contaminant according to the particular embodiment. For example, a source of hydrogen sulfide that has over 50% hydrogen sulfide may also be sufficient. The gas source 14 is preferably in fluid communication with a control panel 16 to regulate the flow of chemically reactive gas, in vapor form, from the gas source 14. The chemically reactive gas that flows to the control panel 16 is then conveyed to one or more delivery sites 18 in a subterranean body of groundwater, generally indicated by reference number 18. The location of the delivery sites 18 can be determined in a variety of ways, as described herein.

The gas source 14 is in fluid communication with the control panel 16 via a pressure hose 22 or other such device. In this manner, the chemically reactive gas is conveyed, in vapor form, from the gas source 14 to the control panel 16. The gas source 14 includes a shut off valve 24 configured to reduce and/or essentially stop the flow of chemically reactive gas therefrom. For example, the shut off valve 24 modulates the flow of chemically reactive gas from the gas source 14 to the pressure hose 22 and may be manually and/or electronically controlled. The shut off valve 24 may include any suitable valve or other such flow regulating device. Specific examples of suitable valves include gate valves, ball valves, solenoid valves, proportional air valves, and the like.

The control panel 16 includes a pressure regulator 26 that is fluidly connected to the pressure hose 22. The pressure regulator 26 regulates or modulates the pressure of chemically reactive gas exiting the gas source 14. In accordance with an embodiment, the pressure regulator 26 is set such that the pressure of chemically reactive gas exiting the gas source 14 is set for example, at 100 pounds per square inch (psi). In various other embodiments, the pressure regulator 26 is controlled to dispense gas at greater or lesser pressures. In addition, the pressure may be modulated in response to a variety of factors. These factor include one or more of the following: permeability of the substrate; amount of contaminant; distance below the surface that gas is dispensed; and the like. According to an embodiment, the flow of reactive gas is modulated in response to change of some or all of these factors if they occur during remediation treatment.

The chemically reactive gas that exits the pressure regulator 26 enters a first conduit 28, which conveys the pressure regulated chemically reactive gas to a header pipe 30. The header pipe 30 has a plurality of flow meters 32 connected thereto and which are in fluid communication therewith to receive the pressure regulated chemically reactive gas. Some or all of the pressure regulator 26, the first conduit 28, the header pipe 30, and the plurality of flow meters 32 are disposed within the control panel 16. The control panel 16 is placed on or mounted to any suitable surface or structure. Suitable surfaces and structures include, for example, fences, walls, posts, the ground, buildings, and the like. The flow meters 32 regulate the flow of chemically reactive gas from the header pipe 30 to a respective delivery conduit 36. That is, each flow meter 32 is in communication with a respective delivery conduit 36.

While the embodiment shown in FIG. 1 includes six delivery conduits 36, in other embodiments, any suitable number of delivery conduits 36 are utilized. For example, 10, 20, or more delivery conduit 36 may be included. Each of the delivery conduits 36 terminates at a respective one of the plurality of delivery sites or points 16. Accordingly, the number of flow meters 32 that are utilized in a particular system will depend upon the number of delivery sites 18 that are determined to be adequate to remediate the subsurface body of water at a given location. Similarly, the number of delivery conduits 36 will depend upon the number of delivery sites 18 that are determined to be adequate to remediate a subsurface body of water. Thus, each delivery site 18 has a delivery conduit 36 and a flow meter 32 associated therewith to regulate the flow of chemically reactive gas to that delivery site 18. The conduits, pipes, tubes, and delivery points are constructed from any suitable material. Examples of suitable materials include, for example, PVC, other plastic, metal, and the like. The delivery conduits 36 include any suitably sized tubing. For example, the delivery conduit 36 are preferably ¼ to 1 inch tubing and more preferably, the delivery conduits 36 are ½ inch tubing.

Table 1 illustrates specific examples of chemical reactions induced in the subsurface body of water by the remediation system 10 according to various embodiments. As shown, when hexavalent chromium Cr(VI) is present in the subsurface body of water, chemically reactive gas, such as hydrogen sulfide, reduces the Cr(VI) to Cr(III).

TABLE I

| | |
|---|---|
| $8CrO_4^{2-} + 3H_2S + 10H^+ + 4H_2O \rightarrow 8Cr(OH)_3 + 3SO_4^{2-}$ | rxn. 2 |
| $2CrO_4^{2-} + 3H_2S + 4H^+ \rightarrow 2Cr(OH)_3 + 3S^0 + 4H_2O$ | rxn. 3 |
| $ZnO + H_2S + 5H_2O \rightarrow Zn(OH)_2 + SO_4 + 5H_2$ | rxn. 4 |
| $CdO + H_2S + 5H_2O \rightarrow Cd(OH)_2 + SO_4 + 5H_2$ | rxn. 5 |
| $HgO + H_2S + 5H_2O \rightarrow Hg(OH)_2 + SO_4 + 5H_2$ | rxn. 6 |

In reactions 2 and 3 illustrated in Table I, Cr(III) hydroxide is a product of the reduction of hexavalent chromium. Chromium III hydroxide is a naturally occurring and is typically considered nontoxic. In addition to the reduction of hexavalent chromium, the reactions illustrated in Table I further generate sulfate or elemental sulfur. In general, these products are not considered as contaminants. Similarly, Zinc, Cadmium, and Mercury are respectively illustrated in reactions 4, 5, and 6. In each instance, the contaminant is reduced to a non or less toxic form or to a form that is less soluble in water. However, embodiments of the invention are not limited to chemical reduction of contaminants. For example, the chemically reactive gas need not be hydrogen sulfide, but rather, another reducing agent and/or an oxidizing agent is utilized in various other embodiments. In a particular example, ozone $O_3$ is utilized as the chemically reactive gas. When utilized, ozone oxidizes organic and chlorinated contaminants such as, for example: petroleum products, explosives, chlorinated solvents, and the like.

The system 10 is installed at any suitably contaminated site. Examples of suitable sites include: mining operations, waste treatment facilities, chemical and Industrial facilities, manufacturing facilities, storage facilities, service stations, munitions testing ranges, factories, refineries, and the like. To determine whether the subsurface body of water is contaminated, the subsurface body of water can be tested through the use of a monitoring well or the like.

Once it has been determined that the subsurface body of water is contaminated, in accordance with the present invention, the location of the delivery points or sites can be determined. The location of the delivery points can be determined in a variety of different methods. Preferably, however, the delivery points are located in a grid that takes into account the direction and flow rate of flow in the subsurface body of water. By taking into account the rate of flow, delivery sites will be positioned to prevent contaminants from spreading. Typical grid determination is based on site specifics, but generally, a grid is based on a determination of two months of flow. For example, if the rate of flow in the subsurface body of water or groundwater is 120 feet per year, the grid would be a 20 foot grid. A grid pattern is preferred as it helps insure proper spacing between the delivery sites and consistent chemically reactive gas levels in both the vadose zone and in migrating subsurface body of water.

A plurality of monitoring wells are preferably utilized to determine the extent and location of any contaminants so that the system usage can be maximized. In this regard, any suitable number of monitoring wells can be employed. The delivery sites 18 are optionally located in a grid pattern as shown (i.e. columns and rows), and then the delivery conduits 36, which are connected to the gas source 14 and the control panel 16 are installed in order to inject the chemically reactive gas, preferably in vapor form, into the subsurface body of water at each of the delivery sites 18. As set forth herein, the injected chemically reactive gas is optionally pure. Alternatively, the purity of the chemically reactive gas need only be sufficient to reduce some portion of the contaminants, as discussed herein.

The level of chemically reactive gas in the soil gas vapor can be determined through soil gas monitoring and testing techniques, as are known in the art. For example, once the system 10 is installed, the chemically reactive gas is regulated and metered to be delivered into the subsurface body of water at a predetermined rate. The rate is preferably adjusted over time. The dissolved chemically reactive gas in the subsurface body of water and the amount of chemically reactive gas in the soil gas vapor are monitored to assure a sufficient flow of chemically reactive gas to the delivery sites 18. Similarly, the chemically reactive gas is monitored to determine if too much chemically reactive gas is being added in order to prevent undue waste of chemically reactive gas and thereby increase expense. In addition, by monitoring the chemically reactive gas and modulating the flow thereof in response to the monitored levels and via application of a vacuum to collect emissions of the chemically reactive gas, leaching of the chemically reactive gas to the atmosphere may be substantially prevented prior to some release. In this regard, according to an embodiment, a recovery system 40 is installed in such a manner so as to collect unspent reactive gas from one or more collection sites 42. That is, reactive gas that does not react with contaminants is collected. This collected reactive gas may be re-injected and/or disposed of.

To collect the unspent reactive gas from the collection sites 42, the recovery system 40 includes any suitable number of gas recovery portions 44 in fluid connection with a similar number of respective recovery conduits 46. In a particular example, the number of gas recovery portions 44 is similar to the number of gas delivery portions 38. The gas recovery portions 44 are disposed relative to the gas delivery portions 38 such that excess chemically reactive gas tends to pass in the vicinity of the gas recovery portions 44. For example, if the subsurface body of water 20 is relatively static, the gas recovery portions 44 may be disposed essentially directly above respective gas delivery portions 38. In another example, if the subsurface body of water 20 flows at relatively substantial rate, the gas recovery portions 44 may be disposed essentially down stream of respective gas delivery portions 38.

To draw excess chemically reactive gas from the collection sites 42, the recovery system 40 is configured to generate a partial vacuum in accordance with an embodiment. This partial vacuum may be maintained via the action of pump or other such device. In this regard, the recovery conduits 46 are in fluid communication with a plurality of respective flow meters 48. These flow meters 48 are disposed upon a control panel 50. In addition, the flow meters 48 are in fluid communication with a vacuum source 52 configured to generate at least a partial vacuum and thereby draw unspent reactive gas from the collection sites 42.

Unspent chemically reactive gas collected via the recovery system 40 may be feed back into the delivery system 12 and/or disposed of. For example, excess hydrogen sulfide may be neutralized by passage through a bed of reactive metal, such as zinc.

The level of chemically reactive gas in the soil gas vapor can be controlled by regulating the flow of chemically reactive gas to each of the delivery sites 18 through their associated flow meters 32. If not enough chemically reactive gas is injected into the subsurface body of water 20, i.e., the level of chemically reactive gas in the soil gas vapor is significantly less than a predetermined low concentration, the remediation process will occur relatively slowly. If too much chemically reactive gas is injected, the remediation process will not occur any faster than it would with the preferred levels of chemically reactive gas. Therefore, the flow rate and pressure of the chemically reactive gas to the delivery sites 18 can be varied as needed to increase or decrease the flow rate of chemically reactive gas. The effect of the system on the contaminants can be monitored periodically through the monitoring wells. Further, if the gas source 14 becomes depleted, it can be easily replaced without disrupting the remediation process.

The preferred system is relatively inexpensive to install as it costs significantly less than prior systems. Moreover, according to some embodiments, the remediation system 10 operates twenty-four hours a day and may operate in a substantially autonomous manner.

As discussed herein, in the preferred embodiment, a plurality of delivery conduits 36 are utilized to convey the pure chemically reactive gas from the gas source 14 to the delivery sites 18. The delivery sites 18 and the delivery conduits 36 can be installed by any of a variety of methods, including by typical drilling and installing a groundwater well and installing perforated or slotted pipes with sand backfill. This is primarily for sites interbedded with clays, sands, and the like. Alternatively, the delivery conduits 36 may be installed by known GeoProbe™. (GeoProbe is a registered trademark of KEJR Engineering, Inc. of Kansas) installation techniques.

In accordance with the above-described system, the delivery conduits 36 are preferably installed by airjet injection. In accordance with the present invention, airjet injection utilizes a compressor that is connected to a delivery conduit 36 via a hose. The air flow and pressure from the compressor act as a cutting tool allowing the delivery conduit 36 to be "injected" or inserted into the ground with minimal site description and with minimal time and capital expense. It has been determined that up to eighty (80) or more delivery points can be installed in a single day. This is significantly higher than the number of points that could be installed under prior installation methods.

Figure 2:
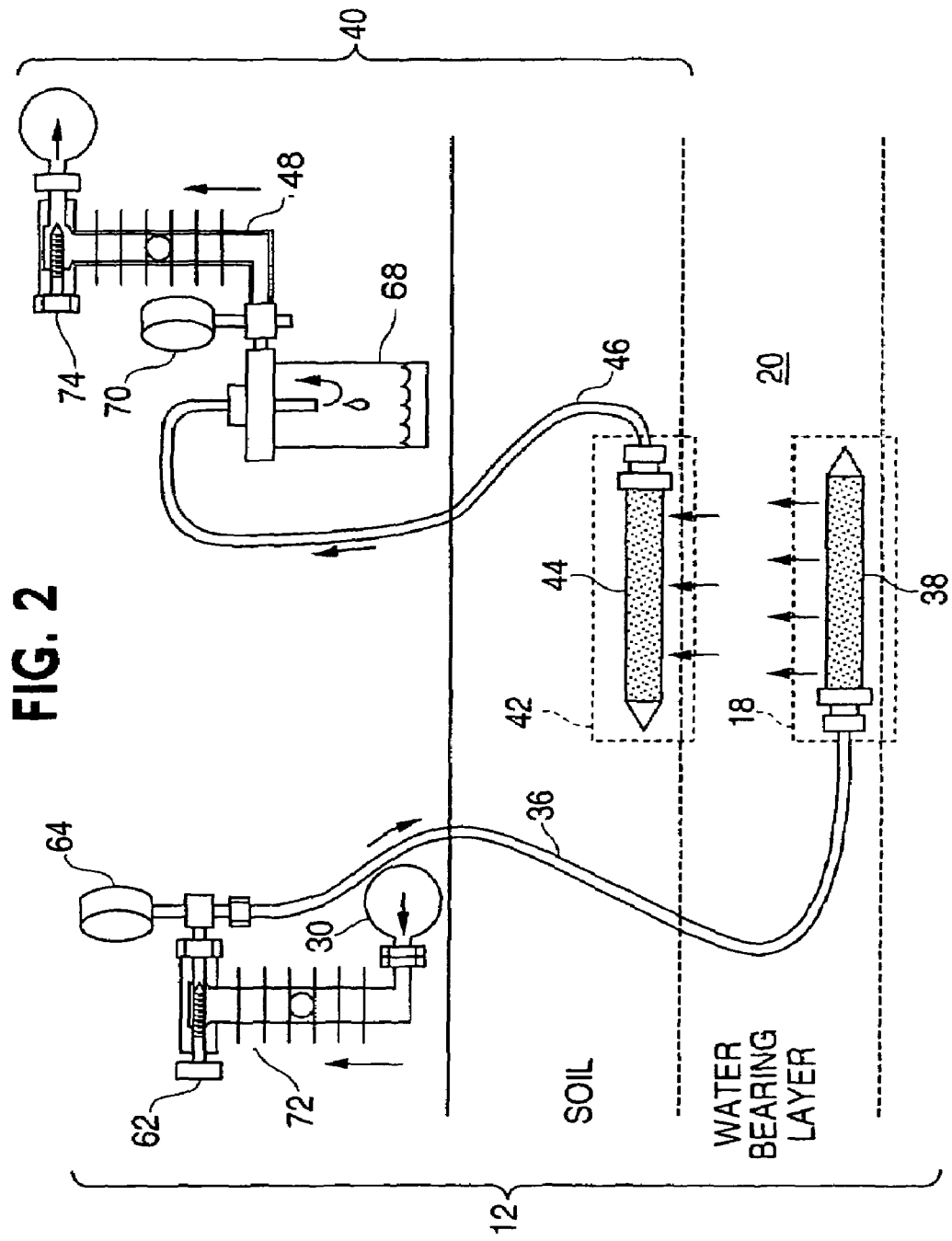
FIG. 2 is an illustration of various components that are suitable for use with the embodiment of the invention illustrated in FIG. 1.

As shown in more detail in FIG. 2, each flow meter 32 is in fluid connection with the header pipe 30 in such a manner so as to allow chemically reactive gas at the regulated pressure to be delivered thereto. Each flow meter 32 includes flow regulator 62 and a pressure indicator 64 in fluid communication therewith. The flow regulator 62 facilitates individual modulation of the flow of chemically reactive gas therethrough. Suitable examples of flow regulators include needle valves, proportional air valves, and the like. The pressure indicator provides a visual indication of the pressure of vapor, such as chemically reactive gas, flowing therethrough. The delivery conduits 36 that are in communication with the outlet of the flow meters 32 preferably extend through a protective tube 66 (FIG. 1), which extends from the control panel 16 into the ground. The protective tube 66 acts to shield and protect the delivery conduits 36.

The delivery conduit 36 preferably extends at least one foot below the ground and, eventually, into communication with the subsurface body of water 20. As shown, the delivery conduit 36 intersects the subsurface body of water 20 and terminate below the water table at a designated delivery site 18 in order to deliver the pure chemically reactive gas thereto. In this regard, the gas delivery portion 38 of the delivery conduit 36 is configured to introduce the chemically reactive gas into the subsurface body of water 20. To introduce the chemically reactive gas, the gas delivery portion 38 includes at least one orifice. For example, according to various embodiments, the gas delivery portion 38 includes a plurality of slots, holes, pores, or the like.

In general, these pores, holes or slots are configured to generate relatively small bubbles and thereby increase adsorption of the chemically reactive gas into the subsurface body of water 20. The size range of the bubbles produced is dependent upon a variety of factors. These factors include one or more of the following: pore size of the gas delivery portion 38, ambient pressure of the subsurface body of water 20, constituents of the chemically reactive gas, and the like. In general, the bubble size range varies from about 0.2 mm to about 10 mm. More specifically, the bubble size range varies from about 0.5 mm to about 2 mm. To generate bubbles of this size range, the pore size of the gas delivery portion 38 varies from about 50 microns to about 2 mm. More specifically, the pore size varies from about 80 microns to about 300 microns. In a particular example, the gas delivery portion 38 includes a porous material such as, for example, heat bonded silica graduals, heat bonded metal particles, spun fibers, mesh screens, and the like.

Un-reacted or otherwise unspent reactive gas that rises up through the subsurface body of water 20 to the collection site 42 is drawn into the gas recovery portion 44 via the action of the vacuum source 52. In general, the gas recovery portion 44 is configured to draw in gas while substantially excluding liquid. In this regard, the gas recovery portion 44 is preferably disposed above the subsurface body of water 20. However, in another example, the gas recovery portion 44 may be disposed within the subsurface body of water 20. In this example, a liquid excluding device or coating may be employed to limit the inflow of liquid. Alternatively, the gas recovery portion 44 may draw in gas and liquid non-preferentially. Also shown in FIG. 2, the recovery system 40 includes an optional liquid separator 68. If present, the liquid separator 68 is configured to facilitate removal of liquid that may be present in the returning gasses. In this manner, components sensitive to the presence of liquid may be substantially protected.

Materials draw in by the gas recovery portion 44 are conveyed via the recovery conduit 46, through the liquid separator 68, if present, and through a vacuum indicator 70. The vacuum indicator 70 is in fluid communication with the recovery conduit 46 and also with the flow meter 48. In this manner, the amount of recovered gasses may be monitored. In addition, the flow meter 48 includes a flow regulator 72 in fluid communication therewith for modulating the flow of unspent reactive gas therethrough.

Figure 3:
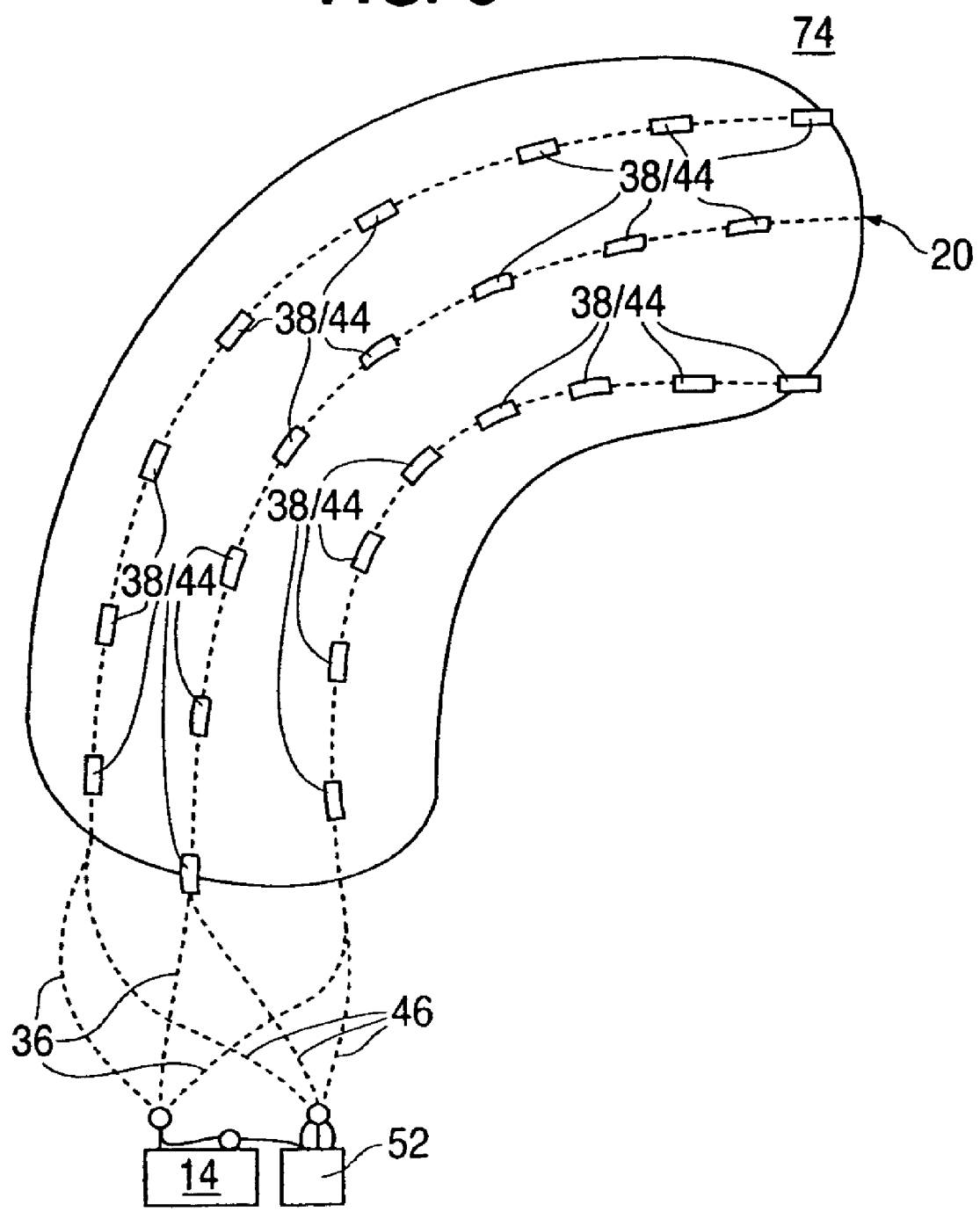
FIG. 3 is a schematic plan view of the remediation system according to another embodiment of the invention.

FIG. 3 is a schematic plan view 74 of the remediation system 10 according to another embodiment of the invention. As shown in FIG. 3, the remediation system 10 includes 24 gas delivery portions 38 and 24 respective gas recovery portions 44. The 24 gas delivery portions 38 and 24 respective gas recovery portions 44 are generally arrayed in a grid-like pattern to facilitate efficient remediation of the subsurface body of water 20.

Figure 4:
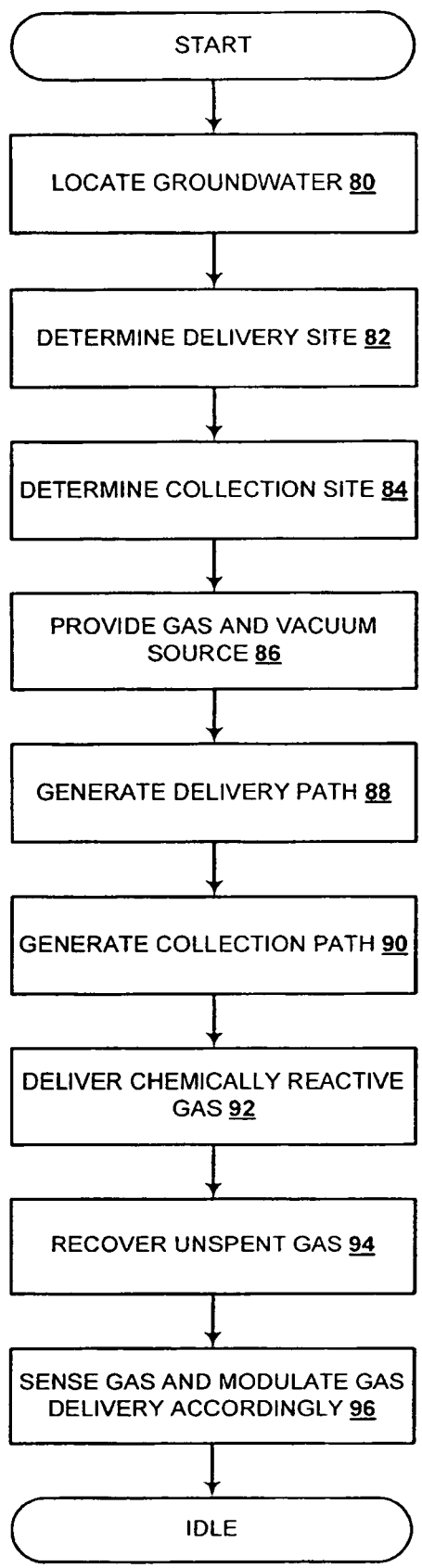
FIG. 4 is a flow diagram for a method of remediating a subsurface body of water according to an embodiment of the invention.

FIG. 4 is a flow diagram for a method 78 of remediating the subsurface body of water 20 according to an embodiment of the invention. Prior to the initiation of the method 78, a variety of operations may be performed. These operations include, in no particular order, one or more of the following: the subsurface body of water 20 is determined to be contaminated by testing the water for example; the remediation system 10 is prepared for installation; a power source is provided; and the like. The method 78 at step 80 by locating the subsurface body of water 20. That is, location of the subsurface body of contaminated water is determined. More particularly, the size and shape or outline of the subsurface body of water 20 is determined. For example, a series of wells are drilled into the ground to test for the presence of water. This series of wells may begin at a known location of the subsurface body of water 20 and radiate outward from that point. Wells that do not contact the subsurface body of water 20 may be determined to be outside the outline of the subsurface body of water 20. In this manner, a general shape or plan view of the subsurface body of water 20 may be determined.

At step 82 at least one delivery site 18 is determined. In general, the delivery site 18 is configured to facilitate adsorption of the chemically reactive gas into the subsurface body of water 20. In this regard, it may be advantageous to determine a relatively lowest point to which the subsurface body of water 20 extends and then to have this relatively lowest point essentially coincide with the delivery site 18.

For example, the wells utilized at step 80 to determine the general outline of the subsurface body of water 20 may also be utilized to determine the depth to which the subsurface body of water 20 extends. More particularly, materials from the bottom of the wells may be analyzed periodically. Once water bearing soils are no longer being withdrawn from the wells and, instead, relatively water impermeable soils are being withdrawn, it may be determined that the relatively lowest point of the subsurface body of water 20 has been determined.

At step 84 at least one collection site 42 is determined. In general, the collection site 42 is configure to facilitate removal of excess chemically reactive gas from the subsurface body of water 20. In this regard, it may be advantageous to determine a relatively highest point to which the subsurface body of water 20 extends and then to locate the collection site 42 at or above the relatively highest point. This relatively highest point is also disposed generally above a corresponding delivery site 18. In this manner, chemically reactive gas delivered at the relatively lowest point is given the opportunity to be adsorbed into the subsurface body of water 20 as it passes up through the water column. To determine the relatively highest point, the well utilized at steps 80 and or 82 may be utilized. More particularly, materials from the bottom of the wells may be analyzed periodically. Once water bearing soils begin to be withdrawn from the wells, it may be determined that the relatively highest point of the subsurface body of water 20 has been determined.

Another consideration when determining the collection site 42 is movement of the waters within the subsurface body of water 20. More particularly, a direction and/or rate of flow for the subsurface body of contaminated water may be determined. For example, a dye or other such indicator may be placed in the subsurface body of water 20 via a well for example. Wells in the vicinity are periodically sampled for the indicator. Once detected, the elapse time, distance, and direction are utilized to determine the movement of the waters. Based on these calculations, the collection site 42 is adjusted to compensate for these movements.

In addition, while at steps 82 and 82 respective examples are made of one delivery site 18 and one collection site 42, embodiments are not limited to one delivery site 18 and one collection site 42, but rather, any suitable number of delivery sites and collection sites are within the purview of the invention. In this regard, 24 delivery sites 18/collection sites 42 are illustrated in FIG. 3. Still other embodiments include less the 24 or upwards of 100 or more delivery sites 18/collection sites 42.

At step 86 the gas source 14 and vacuum source 52 are installed. The location of the installation is generally dependent upon the locations of the one or more delivery sites 18 and collection sites 42. That is, as shown in FIG. 3, the gas source 14 and vacuum source 52 are installed at an end of the subsurface body of water 20. In this manner, the location of the gas source 14 and vacuum source 52 facilitate efficient boring operations.

At step 88 a path is generated in fluid communication from the supply of chemically reactive gas to the delivery site. That is, holes are bored and the delivery conduits 36 are disposed within these holes. These operations typically occur in an essentially simultaneous manner by utilizing a fracturing device to bore the hole and pull the delivery conduit 36 therethrough. The fracturing device includes any suitable pneumatic, pressurized air, and/or pressurized water boring device.

At step 90 a path is generated in fluid communication from the collection site 42 to the vacuum source. That is, in a manner similar to step 88, holes are bored and the recovery conduits 46 are disposed within these holes. These operations typically occur in an essentially simultaneous manner by utilizing a fracturing device to bore the hole and pull the recovery conduit 46 therethrough.

At step 92 a controlled amount of the chemically reactive gas is delivered to the delivery site 18. For example, the flow regulator 62, pressure regulator 26, and/or the shut off valve 24 are modulated to adjust the flow of chemically reactive gas flowing therethrough.

At step 94 the excess chemically reactive gas is removed from the collection site 42. For example, the excess chemically reactive gas is drawn into the gas recovery portion 44 via the action of the vacuum source 52.

At step 96 gas drawn in is optionally sensed by a gas sensing device. Such devices are well known to those skilled in the art, and as such, are not described in detail herein. Based upon the sensed gasses, the delivery of chemically reactive gas at step 92 may be modulated. For example, if the quantity of chemically reactive gas removed from the collection site 42 exceeds a predetermined maximum amount, the amount of chemically reactive gas delivered to the delivery site may be decreased. In another example, if the quantity of chemically reactive gas removed from the collection site 42 is below a predetermined minimum amount, the amount of chemically reactive gas delivered to the delivery site may be increased. These modulations may be performed for each delivery site 18/collection site 42.

Although the remediation system 10 is described for use remediating water, it is to be understood that other embodiments are capable of remediating other materials such as, for example, soil.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for collecting gas from a subsurface body of contaminated water, the system comprising:
   a site to collect unabsorbed reactive gas from the subsurface body of contaminated water;
   a vacuum source connected to the site;
   a controller to regulate a flow of the reactive gas from the site to the vacuum source;
   a line to provide fluid communication between the vacuum source and the site;
   a boring device to generate a bore hole, wherein the line is disposed within the bore hole; and
   a porous device being coupled to an end of the line and disposed at the site, the porous device being configured to facilitate the intake of the unabsorbed reactive gas while substantially preventing an ingress of soil, wherein the porous device further comprises a plurality of heat bonded metal particles being coupled to the end of the line.

2. The system according to claim 1, further comprising:
   a vessel to store the reactive gas.

3. The system according to claim 2, further comprising:
   a reactant disposed within the vessel to react with the reactive gas.

4. The system according to claim 3, wherein the reactive gas includes hydrogen sulfide and the reactant includes zinc configured to react with the hydrogen sulfide.

5. The system according to claim 1, further comprising:
a plurality of bore holes; and
a plurality of lines, wherein each line of the plurality of lines is disposed within a respective bore hole of the plurality of bore holes.

6. The system according to claim 5, wherein the controller comprises:
a plurality of flow meters, wherein each flow meter of the plurality of flow meters is in fluid communication with a respective line of the plurality of lines.

7. The system according to claim 1, wherein the porous device further comprises:
a screen being coupled to the end the line.

8. The system according to claim 1, further comprising:
a liquid separator disposed between the site and the vacuum source, the liquid separator being configured to substantially prevent liquid from entering the vacuum source.

9. An apparatus for removing excess reactive gas from a subsurface body of contaminated water, the apparatus comprising:
means for providing a vacuum source;
means for determining a collection site, the collection site being configured to facilitate removal of excess chemically reactive gas from the subsurface body of contaminated water;
means for generating a path in fluid communication from the collection site to the vacuum source;
means for removing the excess chemically reactive gas from the collection site;
a means for boring to generate a bore hole, wherein the path is disposed within the bore hole; and
a porous means being coupled to an end of the path and disposed at the collection site, the porous means being configured to facilitate the intake of the unabsorbed reactive gas while substantially preventing an ingress of soil, wherein the porous means further comprises a plurality of heat bonded metal particles.

10. The apparatus according to claim 9, further comprising:
means for determining a direction of flow for the subsurface body of contaminated water;
means for determining a rate of flow for the subsurface body of contaminated water; and
means for determining the collection site relative to a delivery site based on the direction and rate of flow.

11. The apparatus according to claim 9, further comprising:
means for removing a liquid from the path prior to the liquid reaching the vacuum source.

12. The apparatus according to claim 9, further comprising:
means for determining a relatively highest point to which the subsurface body of contaminated water extends; and
means for disposing the collection site above the relatively highest point.

13. The apparatus according to claim 9, further comprising:
means for sensing the excess chemically reactive gas; and
means for modulating an amount of chemically reactive gas being delivered to a delivery site in response to the sensed excess chemically reactive gas.

14. An apparatus for removing excess reactive gas from a subsurface body of contaminated water, the apparatus comprising:
a vacuum pump;
a reaction vessel connected to the vacuum pump;
a valve connected to the reaction vessel;
a pipe having a first end and a second end, the first end being connected to the valve;
a screen connected to the second end;
a line to provide fluid communication between the vacuum source and the site;
a boring device to generate a bore hole, wherein the line is disposed within the bore hole; and
a porous device being coupled to an end of the line and disposed at the site, the porous device being configured to facilitate the intake of the unabsorbed reactive gas while substantially preventing an ingress of soil, wherein the porous device further comprises a plurality of heat bonded metal particles being coupled to the end of the line.

15. A method of removing excess gas from a subsurface body of contaminated water, the method comprising:
providing a vacuum source;
determining a collection site, the collection site being configured to facilitate removal of excess chemically reactive gas from the subsurface body of contaminated water;
generating a path in fluid communication from the collection site to the vacuum source;
coupling a porous device to an end of the path disposed at the collection site, the porous device comprising a plurality of heat bonded metal particles; and
removing the excess chemically reactive gas from the collection site, wherein the porous device being configured to facilitate the intake of the unabsorbed reactive gas while substantially preventing an ingress of soil.

16. The method according to claim 15, further comprising:
determining a direction of flow for the subsurface body of contaminated water;
determining a rate of flow for the subsurface body of contaminated water; and
determining the collection site relative to a delivery site based on the direction and rate of flow.

17. The method according to claim 15, further comprising:
removing a liquid from the path prior to the liquid reaching the vacuum source.

18. The method according to claim 15, further comprising:
determining a relatively highest point to which the subsurface body of contaminated water extends; and
disposing the collection site above the relatively highest point.

19. The method according to claim 15, further comprising:
sensing the excess chemically reactive gas; and
modulating an amount of chemically reactive gas being delivered to a delivery site in response to the sensed excess chemically reactive gas.

* * * * *